(12) United States Patent
Heath et al.

(10) Patent No.: US 11,621,548 B2
(45) Date of Patent: Apr. 4, 2023

(54) BRACKETS FOR MOUNTING ANTENNA CABLES

(71) Applicant: CommScope Technologies LLC, Hickory, NC (US)

(72) Inventors: Dale Richard Heath, Fort Worth, TX (US); Raphael J. de La Soujeole, Irving, TX (US); Ronald A. Vaccaro, Taylorsville, NC (US); Robert J. Campbell, Irving, TX (US)

(73) Assignee: CommScope Technologies LLC, Hickory, NC (US)

( * ) Notice: Subject to any disclaimer, the term of this patent is extended or adjusted under 35 U.S.C. 154(b) by 1 day.

(21) Appl. No.: 17/498,857

(22) Filed: Oct. 12, 2021

(65) Prior Publication Data

US 2022/0029402 A1   Jan. 27, 2022

Related U.S. Application Data

(63) Continuation of application No. 16/375,544, filed on Apr. 4, 2019, now Pat. No. 11,159,006.

(Continued)

(51) Int. Cl.
*H02G 7/20* (2006.01)
*H01Q 1/12* (2006.01)
*H01B 17/14* (2006.01)

(52) U.S. Cl.
CPC ............. *H02G 7/20* (2013.01); *H01Q 1/1242* (2013.01); *H01B 17/14* (2013.01)

(58) Field of Classification Search
CPC .. H02G 7/20; H02G 3/04; H02G 7/05; H02G 3/0406; H02G 3/22; H01Q 1/1242;
(Continued)

(56) References Cited

U.S. PATENT DOCUMENTS 3,652,780 A   3/1972   Wilson
4,025,824 A   5/1977   Cheatham
(Continued)

FOREIGN PATENT DOCUMENTS

CN   206487932 U   9/2017
JP   2012105107 A   5/2012
(Continued)

OTHER PUBLICATIONS

"International Preliminary Report on Patentability corresponding to International Application No. PCT/US2019/054208 dated Apr. 22, 2021".

(Continued)

*Primary Examiner* — Angel R Estrada
(74) *Attorney, Agent, or Firm* — Myers Bigel, P.A.

(57) ABSTRACT

A bracket for mounting cables on an antenna pole includes: a pair of L-shaped members, each of the L-shaped members including a main panel, a pair of jaws extending from opposite edges of the main panel, and a flange extending generally perpendicularly to the main panel, wherein the main panel includes a plurality of first mounting apertures, and wherein the flange includes a plurality of second mounting apertures; a pair of rods, each rod extending through a first mounting aperture of each of the L-shaped members; and a securing component that engages each rod to fix the members relative to each other.

45 Claims, 4 Drawing Sheets

Related U.S. Application Data

(60) Provisional application No. 62/744,771, filed on Oct. 12, 2018.

(58) Field of Classification Search
CPC .. H01Q 1/14; H01Q 9/40; H01Q 1/12; H01Q 1/1207; H01Q 3/08; H01Q 9/16; H01B 17/14; H01B 17/145; H01B 17/16; F16L 3/10; F16L 37/00; F16L 3/00; F16L 3/003; F16L 3/006; F16L 3/08; H04Q 1/02; H04Q 1/00; H04Q 1/06
USPC ......... 174/45 R, 40 R, 480, 481, 68.1, 88 R, 174/70 A, 95; 248/68.1, 49, 69, 73, 65, 248/63; 385/134, 135
See application file for complete search history.

(56) References Cited

U.S. PATENT DOCUMENTS

| | | |
|---|---|---|
| 4,728,749 A | 3/1988 | Knight |
| 7,692,100 B2 | 4/2010 | Boisclair |
| 7,772,500 B2 | 8/2010 | Cho et al. |
| 9,812,762 B2 | 11/2017 | Skrepcinski et al. |
| 9,837,185 B2 | 12/2017 | Korczak et al. |
| 10,253,906 B2 | 4/2019 | Vaccaro |
| 10,873,180 B2 | 12/2020 | Defrance |
| 11,159,006 B2 * | 10/2021 | Heath ...................... H02G 7/20 |
| 2018/0045336 A1 | 2/2018 | Vaccaro |

FOREIGN PATENT DOCUMENTS

| | | |
|---|---|---|
| KR | 200177564 Y1 | 4/2000 |
| KR | 20060008585 A | 1/2006 |
| KR | 20160119402 A | 10/2016 |

OTHER PUBLICATIONS

"International Search Report and Written Opinion corresponding to International Application No. PCT/US2019/054208 dated Jan. 17, 2020".

* cited by examiner

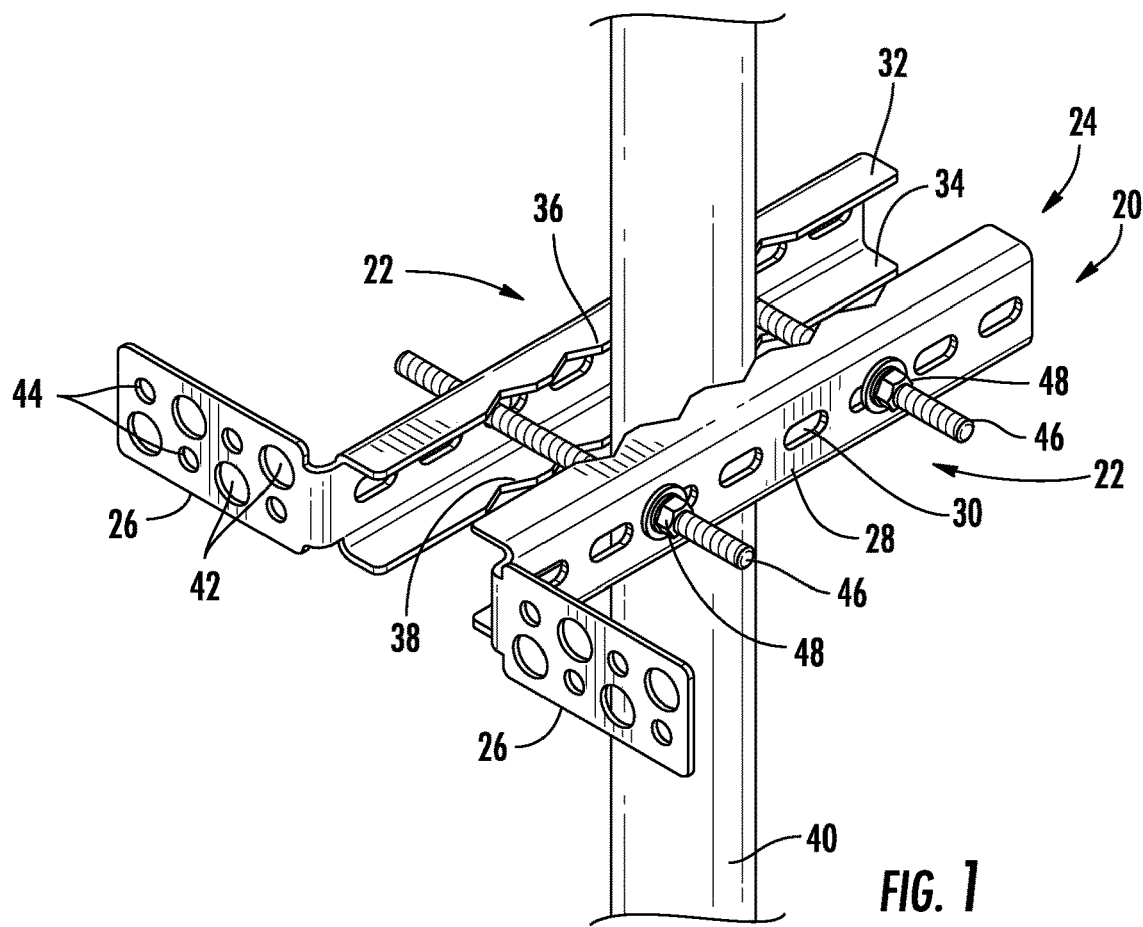
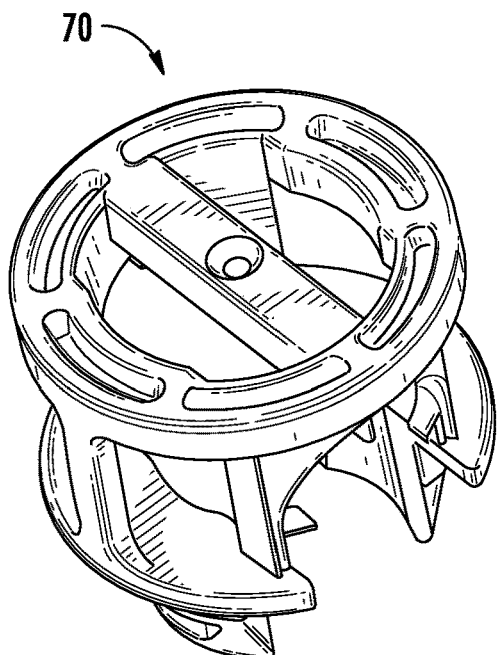
FIG. 2A
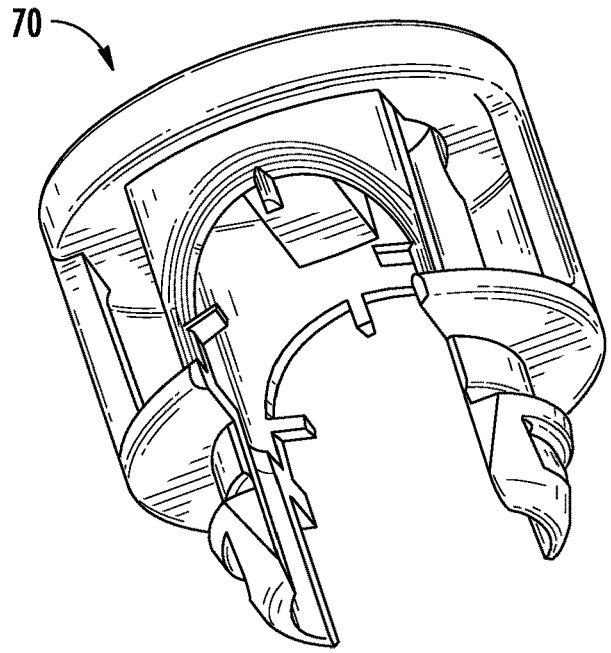
FIG. 2B
FIG. 1

BRACKETS FOR MOUNTING ANTENNA CABLES

RELATED APPLICATIONS

The present application is a continuation of and claims priority to U.S. patent application Ser. No. 16/375,544, filed Apr. 4, 2019, now U.S. Pat. No. 11,159,006, which claims priority from and the benefit of U.S. Provisional Patent Application No. 62/744,771, filed Oct. 12, 2018, the disclosure of which is hereby incorporate herein by reference in its entirety.

FIELD OF THE INVENTION

The present invention relates generally to mounts for antennas, radios and cables, and more particularly to mounts for antennas, radios and cables on an antenna tower or monopole.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

Antennas typically mount to a round pipe; an exemplary mount with round vertical pipes for antenna mounting is shown in U.S. Pat. No. 9,812,762 to Skrepcinski, the disclosure of which is hereby incorporated herein in its entirety). When mounting antennas to towers or other structures, the cables attaching the radio to the antenna typically protrude from the bottom of the antenna for some unsupported length. It is typically desirable to secure these cables to maintain a sense of organization and to prevent swaying in the wind. A system of cable support brackets is commonly used to hold these cables in place. Those cable support systems usually also mount to the same pipe to which the antenna is mounted, and include two half-clamps that are joined with bolts that extend on either side of the pipe. The front plane of one of the half-clamps is parallel to the face of the antenna. Additional brackets are then bolted onto the front half-clamp. Additional support may be needed behind the antenna when the radio is not mounted in close proximity to the antenna and from the radio to an overvoltage protection unit, which is typically mounted in a central position on the mount to feed up to 6 radios.

Areas near cellular antennas (i.e., within 1λ, or one wavelength) can be (relatively) high radio frequency (RF) energy environments. Conductive items in these areas, such as hangers, brackets and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions for hanging cables with reduced (or eliminated) likelihood of PIM generation.

SUMMARY

As a first aspect, embodiments of the invention are directed to a bracket for mounting cables on an antenna pole. The bracket comprises: a pair of L-shaped members, each of the L-shaped members including a main panel, a pair of jaws extending from opposite edges of the main panel, and a flange extending generally perpendicularly to the main panel, wherein the main panel includes a plurality of first mounting apertures, and wherein the flange includes a plurality of second mounting apertures; a pair of rods, each rod extending through a first mounting aperture of each of the L-shaped members; and a securing component that engages each rod to fix the members relative to each other.

As a second aspect, embodiments of the invention are directed to the bracket discussed above in combination with an expansion bracket, the expansion bracket comprising: a main panel with opposed ends and a plurality of third mounting apertures; two end panels that merge with and extend generally perpendicularly to the main panel; and two attachment flanges, each of which extends generally perpendicularly to a respective end panel, each of the attachment flanges secured to a respective flange of one of the L-shaped members.

As a third aspect, embodiments of the invention are directed to a bracket for mounting cables on an antenna pole, comprising: a pair of clamps, each of the clamps including a clamping portion, a securing panel extending from one end of the clamping portion and having a first securing hole, and a cable mounting portion extending from a second, opposite end of the clamping portion, wherein each of the cable mounting portions includes a plurality of merging panels, and each of the panels includes a mounting hole, one of the panels including a second securing hole; a pair of rods, each rod extending through a first securing hole of one of the pair of clamps and through a second securing hole of the other of the pair of clamps; and a securing component that engages each rod to fix the members relative to each other.

BRIEF DESCRIPTION OF THE FIGURES

FIG. 1 is a perspective view of a cable support bracket according to embodiments of the invention.

FIGS. 2A and 2B are top and bottom perspective view of an exemplary polymeric cable hanger that may be employed with the cable support bracket of FIG. 1.

DETAILED DESCRIPTION

Figure 3:
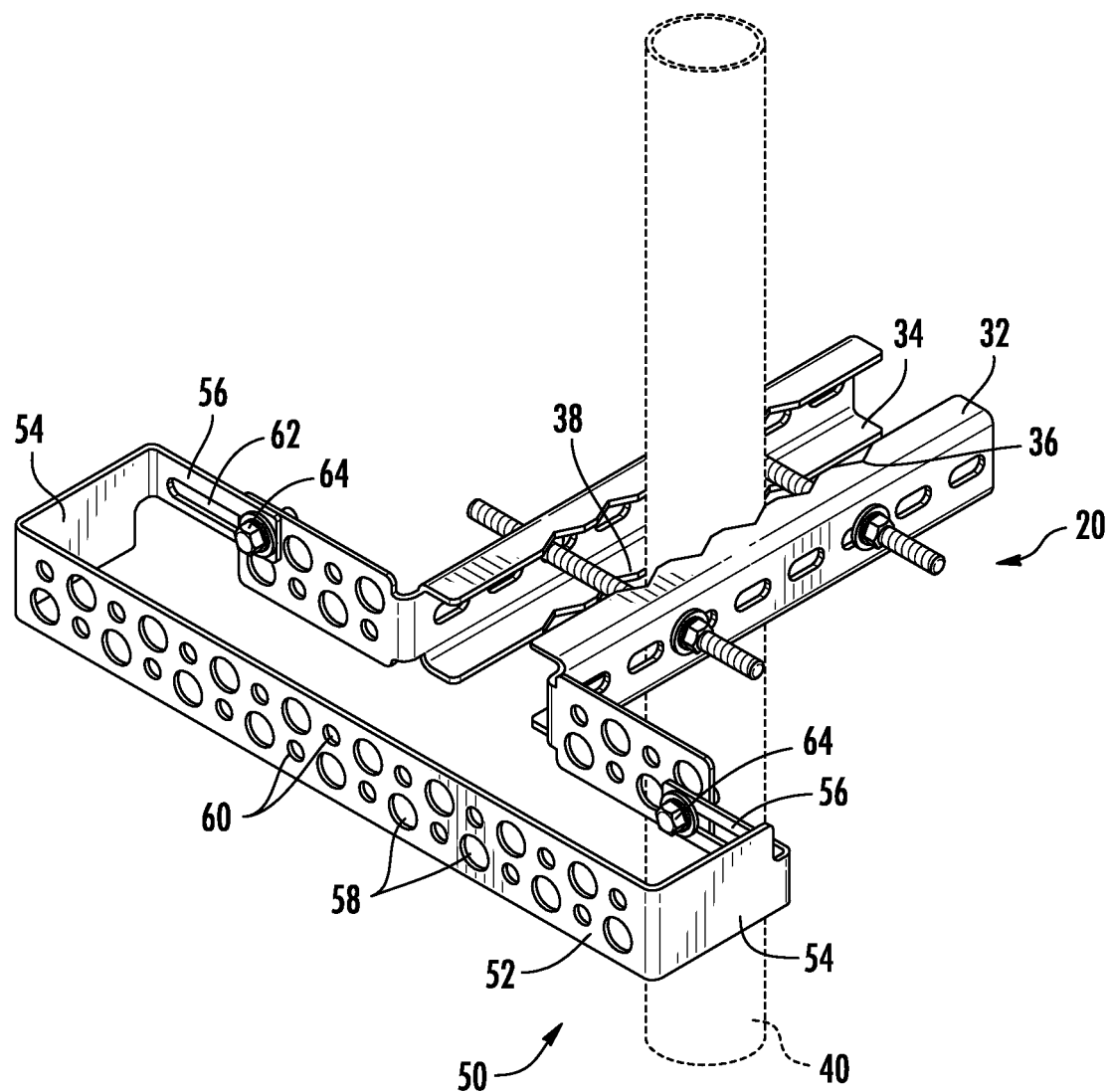
FIG. 3 is a perspective view of the cable support bracket of FIG. 1 and an attached expansion bracket according to embodiments of the invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a cable support bracket according to embodiments of the invention is illustrated in FIG. 1 and designated broadly at 20. The bracket 20 includes two mirror image L-shaped members 22. Only one of the L-shaped members 22 will be described below, with the understanding that the description applies equally to the other of the L-shaped members 22.

Each of the L-shaped members 22 has a clamp portion 24 and a flange 26 that extends substantially perpendicularly to the clamp portion 24. The clamp portion 24 has a main panel 28 with a plurality of mounting slots 30. Upper and lower jaws 32, 34 extend perpendicularly from the upper and lower edges of the main panel 28. The upper and lower jaws 32, 34 have scalloped edges 36, 38.

Each flange 26 includes a plurality (in this instance four) of mounting holes 42. The mounting holes 42 are typically nominally ⅝ inch in diameter. The mounting holes 42 are arranged in staggered fashion in two rows. In the illustrated embodiment, each flange 26 also includes smaller holes 44, also staggered in two rows, that are typically nominally ⁷⁄₁₆ inch in diameter to receive ⅜ inch hangers/hardware.

As can be seen in FIG. 1, the bracket 20 can be mounted to the mounting pole 40 via two threaded rods 46, each of which is inserted into and through a respective slot 30 in the L-shaped members 22, wherein one threaded rod 46 is located on each side of the pole 40. The threaded rods 46 are secured with nuts 48. The scalloped edges 36, 38 have indentations that define mounting locations for the pole 40. Typically, an antenna (not shown) is mounted on the pole 40 above the bracket 20.

Once mounted, the bracket 20 can provide mounting locations for hangers that secure cables in place, and particularly cables routed from the underside of an antenna. Such cable hangers may be polymeric cable hangers that are sized for mounting in the mounting holes 42 and, once mounted, capture cables. An exemplary cable hanger of this sort is shown in FIGS. 2A and 2B at 70 and is described in U.S. Patent Publication No. 2018/0045336 to Vaccaro, the disclosure of which is hereby incorporated herein. The use of polymeric hangers eliminates the generation of PIM from metal-to-metal contact that could result from the use of metal hangers.

The bracket 20 can provide certain performance advantages. For example, the scalloped edges 36, 38 of the upper and lower jaws 32, 34 can enable the bracket 20 to be mounted such that the distances of the flanges 26 from the pole 40 can be varied. As such, the bracket 20 can be mounted so that the flanges 26 and cable hangers mounted thereto are positioned conveniently relative to an antenna also mounted to the pole 40. For example, the bracket 20 may be mounted so that the flanges 26 and cable hangers mounted therein are positioned generally directly below connectors located on the bottom portion of the antenna.

In addition, the shape of the scalloped edges 36, 38 and the positions and lengths of the slots 30 can enable the jaws 32, 34 to clamp on poles of different sizes. Thus, the bracket 20 may be suitable for poles having diameters as small as 2⅜ inches or smaller to as large as 3½ inches or larger.

In addition, the bracket 20 can be mounted to the pole 40 with only the threaded rods 46 and still provide mounting locations for cable hangers below an antenna. This simple arrangement can maintain the number of points of metal-to-metal contact at a low number, and these points can be tightly secured. Both keeping the number of points of contact low and ensuring secure contact can reduce or minimize PIM that can be generated at loose metal-to-metal joints.

Those of skill in this art will appreciate that the bracket 20 may take other forms. For example, the flanges 26 may extend from the main panel 30 at an oblique angle, such as a 30 or 45 degree angle. The flange 26 may include more or fewer mounting holes of either size, the mounting holes may be arranged in more or fewer rows, and/or the holes may not be staggered. The bracket 20 is shown as being formed of a metallic material, such as steel, but may be formed of other materials, such as composites (e.g., reinforced polymers and/or ceramics).

As another example, the bracket 20 may be secured to the pole in other ways. For example, a securing component other than a nut may be employed on the rods (e.g., a cotter pin or spring nut). In such instances, the rods may not be threaded as described above.

As a further example, the scalloped edges 36, 38 of the upper and lower jaws 32, 34 are shown as having gradually curved roots and crests, but as used herein the term "scalloped edges" is intended to include other edges that have roots and crests, including herringbone, sawtooth, wavy, sinuous and the like. In the illustrated embodiment, the crests are separated by about ½ and 1 inch, and the roots are between about ¼ and ½ inch deeper than the crests.

In addition, in some embodiments the L-shaped members 22 may be oriented such that the flange 26 of one L-shaped member 22 is located on one side of the pole 40 (e.g., under the radio) and the flange of the other L-shaped member 22 is located on the opposite side of the pole 40 (e.g., under the antenna). In other words, one of the L-shaped brackets 22 may be inverted from its orientation in FIG. 1. This configuration can provide mounting locations under both the radio and the antenna.

Referring now to FIG. 3, the bracket 20 can be used in conjunction with an expansion bracket 50 to provide a larger number of mounting locations for cable hangers. The expansion bracket 50 is generally C-shaped, with a main panel 52, end panels 54 that extend perpendicularly from the ends of the main panel 52, and attachment flanges 56 that extend perpendicularly to the end panels 54. The main panel 52 includes a plurality of staggered mounting holes 58 arranged in two rows, with smaller offset holes 60. Like the mounting holes 42, 44 of the bracket 20, the mounting holes 58, 60 are typically nominally ⅝ inch and ⁷⁄₁₆ inch in diameter. The attachment flanges 56 include slots 62.

The expansion bracket 50 can be mounted onto the bracket 20 with bolts 64 inserted through the slots 62 in the attachment flanges 56 and aligned holes 44 in the flanges 26 of the bracket 20, where they are secured with nuts (not shown).

Notably, the attachment flanges 56 are vertically offset from each other; i.e., on one side the attachment flange 56 extends from the upper edge of the adjacent end panel 54, and on the other side the attachment flange 56 extends from the lower edge of the adjacent end panel 54. This offset positions each of the attachment flanges 56 in alignment with a respective hole 44 in the flange 26 to which the attachment flange 56 is mounted. This arrangement also enables the expansion bracket 50 to be oriented for mounting irrespective of the "upside-down" or "right-side-up" orientation of the expansion bracket 50.

The expansion bracket 50 mounted to the bracket 20 in this manner significantly increases the number of mounting locations for cable hangers. The advantages discussed above for the bracket 20 are equally applicable here. In particular, the expansion bracket 50 can be secured to the bracket 20 with only two additional mounting points, both of which can be tightly secured, which can reduce or minimize the generation of PIM. Also, the main panel 52 can be mounted at a desired set-off distance from a mounting pole due to the presence of the scalloped edges 36, 38 of the upper and lower jaws 32, 34, which, as discussed above, can enable cable hangers to be mounted near connectors of an antenna mounted on the mounting pole. Moreover, the expansion bracket 50 may be employed independently for wall or rooftop deployments.

Those skilled in this art will appreciate that the expansion bracket 50 could take other forms. For example, the main panel 52 may be longer or shorter, with more or fewer holes 58, 60. The end panels 54 may be longer or shorter. Alternatively, the expansion bracket 50 may comprise simply a main panel with mounting holes that is attached to one or both of the flanges 26 of the mounting bracket 20. Other configurations may also be employed.

Figure 5:
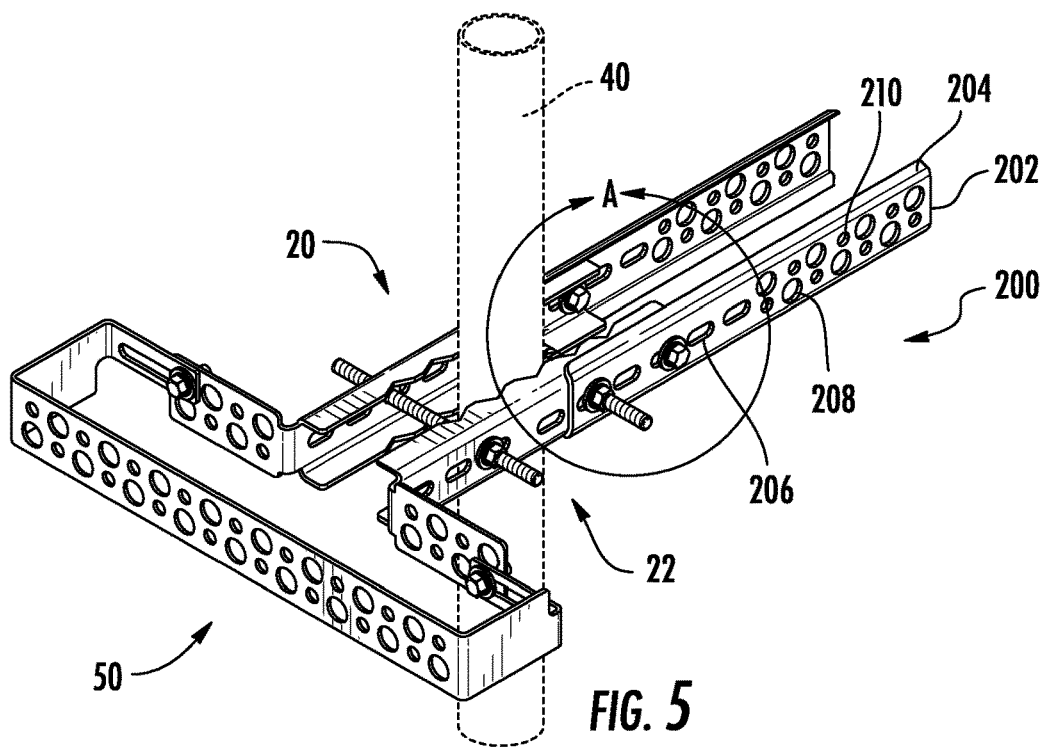
FIG. 5 is a perspective view of the cable support bracket and expansion bracket of FIG. 3 with extender rails attached to the cable support bracket.
Figure 6:
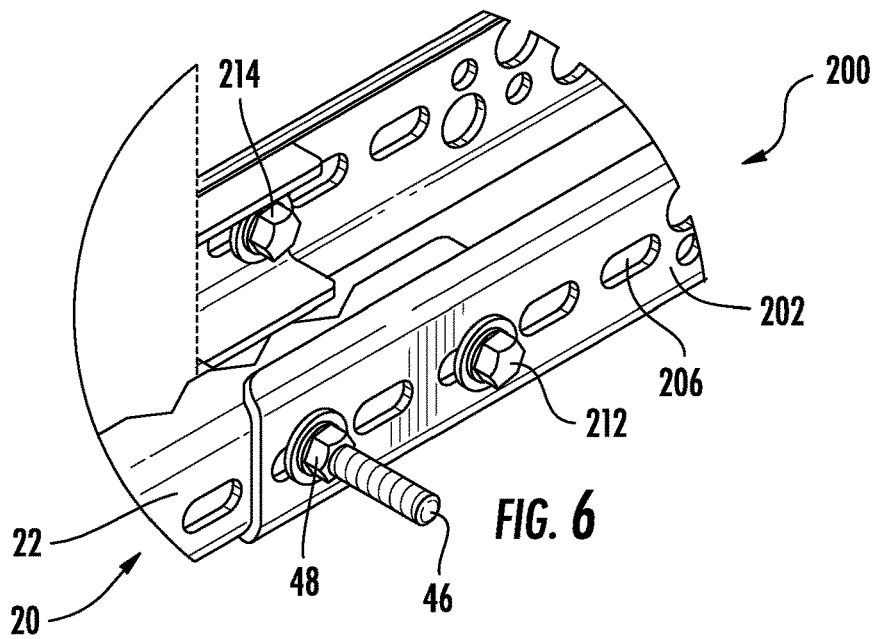
FIG. 6 is an enlarged partial perspective view of the cable support bracket and one extender rail of FIG. 5.
Figure 7:
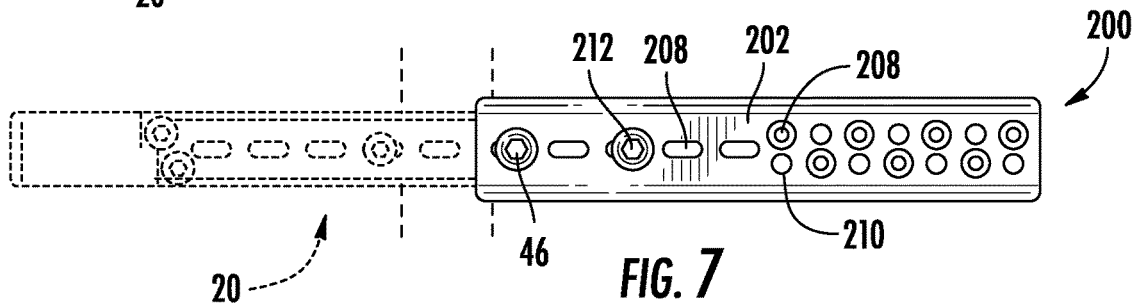
FIG. 7 is a side view of the of the cable support bracket and extender rail of FIG. 6.

The capacity for providing mounting locations for cable hangers can be further enhanced via the use of one or two extender rails, shown in FIGS. 5-7 and designated at 200. Each extender rail 200 is generally C-shaped in profile, with a main panel 202 and lips 204, although in some embodiments the extender rail may lack lips 204 (i.e., the extender rail may be flat and/or planar). On one end, each main panel 202 includes a plurality of mounting slots 206. On the opposite end, each main panel 202 includes a pattern of staggered mounting holes 208 arranged in two rows, with smaller offset holes 210 filling in the "gaps" between the mounting holes 208 in much the same manner as the holes 58, 60 discussed above.

As can be seen in FIG. 6, each extender rail 200 can be attached to the cable support bracket 20 by positioning the extender rail 200 to overlie a free end of the L-shaped member 22, then inserting the threaded rod 46 through the mounting slot 206 at the same time the threaded rod 46 is inserted through the mounting slots 30 of the cable support bracket 20. The nut 48 can then secure both the cable support bracket 20 and the extender rail 200 to the pole 40. The extender rails 200 can be further secured to the cable support bracket 20 with additional bolts and nuts 212, 214 inserted through the mounting slots 206 if desired. As another alternative, the extender rails 200 may be mounted with both threaded rods 46 and no other bolts and nuts.

In this configuration, the holes 208, 210 provide mounting locations for cable hangers such as those shown in FIGS. 2A and 2B, and can provide such locations with similar benefits as discussed above in connection with the expansion bracket 50. Also, the plurality of mounting slots 206 provides the technician with multiple options for locating the extender rails 200 on the bracket 20.

Figure 4:
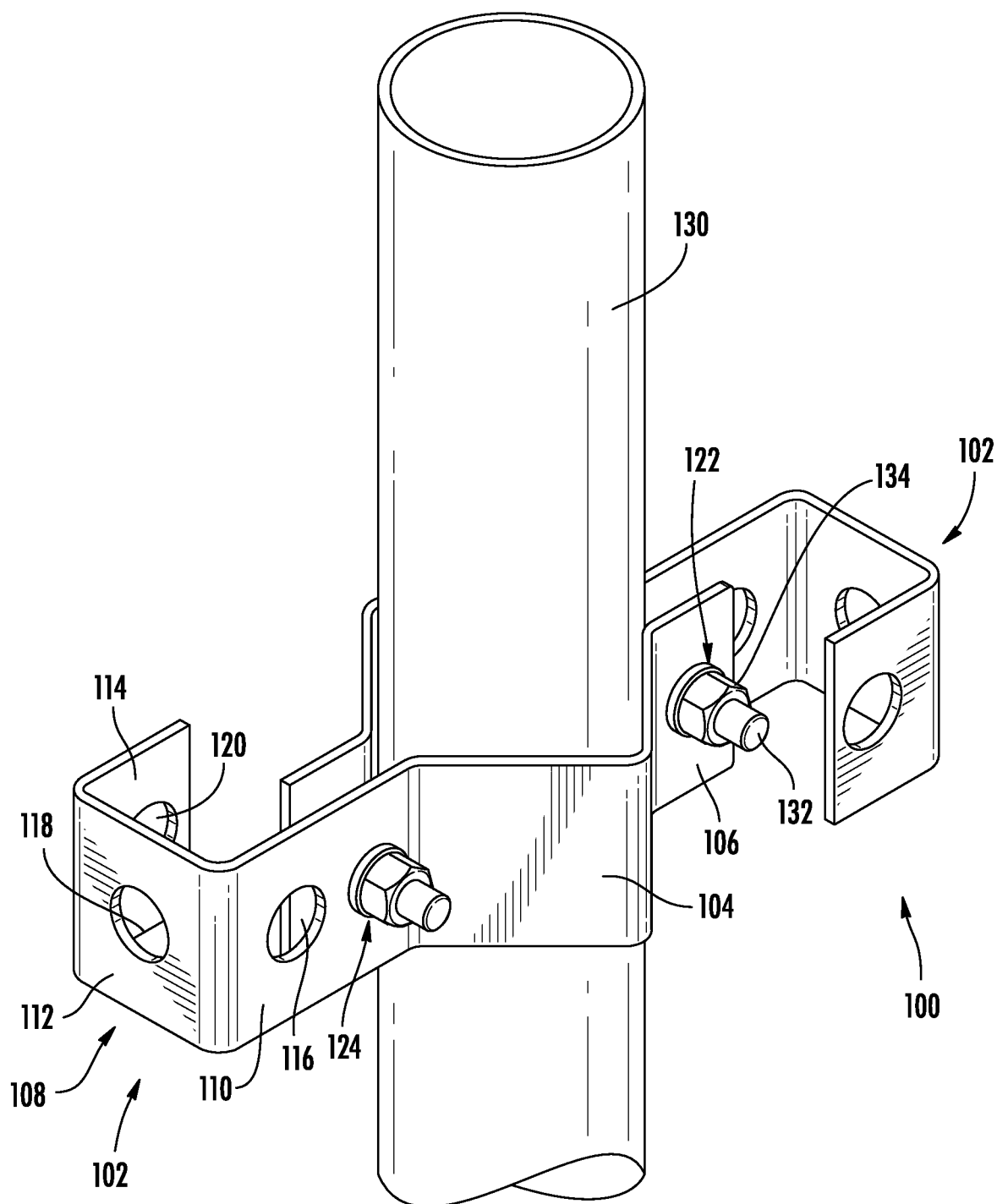
FIG. 4 is a perspective view of a cable support bracket according to alternative embodiments of the invention.

Referring now to FIG. 4, another cable mounting bracket, designated broadly at 100, is shown therein. The bracket 100 comprises two identical clamps 102. Each clamp 102 includes a V-shaped clamping portion 104, a securing panel 106 that extends from one end of the clamping portion 104, and a generally C-shaped cable mounting portion 108 that is mounted to the opposite end of the clamping portion 104. The cable mounting portion 108 includes serially merging near, intermediate and end panels 110, 112, 114 that are disposed at right angles to each other. The near panel 110 is substantially parallel with the securing panel 106 (and may in some embodiments be coplanar with the securing panel 106). The end panel 114 is substantially parallel with the near panel 110. Each of the near, intermediate and end panels 110, 112, 114 includes a respective cable mounting hole 116, 118, 120, which are typically nominally ⅝ inch in diameter. The securing panel 106 includes a mounting hole 122. The near panel 110 includes a mounting hole 124 between the cable mounting hole 116 and the clamping portion 104.

As can be seen in FIG. 4, the clamps 102 can be secured to a mounting pole 130 by positioning the clamps 102 on opposite sides of the pole 130, with the pole 130 captured within the clamping portion 104 of each clamp 102 and with the cable mounting portions 108 of the clamps 102 extending in opposite directions. This arrangement aligns the mounting holes 122 of each clamp 102 with the mounting holes 124 of the other clamp 102. Bolts 132 can then be inserted through the mounting holes 122, 124 and secured with a nut 134. In this position, the bracket 100 can provide mounting locations for a cable hanger such as that shown in FIGS. 2A and 2B, and can do so with tightly secured mounting points to reduce PIM.

Any or all of the bracket 20, expansion bracket 50, extender rails 200, and bracket 100 may be formed of a metallic material, such as steel or aluminum, or of a composite material.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A bracket for mounting cables on an antenna pole, comprising:
    a pair of L-shaped members, each of the L-shaped members including a main panel, a pair of jaws extending from opposite edges of the main panel, and a flange extending generally perpendicularly to the main panel, wherein the main panel includes a plurality of first mounting apertures, and wherein the flange includes a plurality of second mounting apertures; and
    a pair of rods, each rod extending through a first mounting aperture of each of the L-shaped members;
    a securing component that engages each rod to fix the L-shaped members relative to each other; and
    an extension panel having a plurality of third mounting apertures, the extension panel mounted to one of the L-shaped members on an end opposite the flange.

2. The bracket defined in claim 1, wherein the extension panel is mounted to the manel panel of the L-shaped member via one of the rods.

3. The bracket defined in claim 1, wherein the rods are threaded rods, and the securing components are nuts.

4. The bracket defined in claim 1, wherein each of the plurality of second mounting apertures and each of the plurality of third mounting apertures has a nominal diameter of ¾ inch.

5. The bracket defined in claim 1, wherein each of the L-shaped members is a unitary member formed of a metallic material or a composite material.

6. The bracket defined in claim 1, wherein the jaws include scalloped edges.

7. The bracket defined in claim 1, in combination with a mounting pole, the mounting pole being sandwiched between the jaws of the L-shaped members.

8. The bracket defined in claim 1, in combination with at least one cable hanger inserted into one of the second mounting apertures and/or into one of the third mounting apertures.

9. The bracket defined in claim 8, wherein the at least one cable hanger is a plurality of cable hangers.

10. The bracket defined in claim 8, wherein the at least one cable hanger is a polymeric cable hanger.

11. The bracket defined in claim 1, in combination with an expansion bracket comprising:
   a main panel with opposed ends and a plurality of fourth mounting apertures;
   two end panels that merge with and extend generally perpendicularly to the main panel;
   two attachment flanges, each of which extends generally perpendicularly to a respective end panel, each of the attachment flanges secured to a respective flange of one of the L-shaped members.

12. The combination defined in claim 11, wherein each of the plurality of fourth mounting apertures is nominally ⅝ inch in diameter.

13. The combination defined in claim 11, wherein at least one cable hanger is inserted into one of the fourth mounting holes.

14. The combination defined in claim 13, wherein the at least one cable hanger is a plurality of cable hangers.

15. The combination defined in claim 13, wherein the at least one cable hanger is a polymeric cable hanger.

16. The combination defined in claim 11, further comprising a mounting pole, the mounting pole being sandwiched between the jaws of the L-shaped members.

17. The combination defined in claim 16, further comprising an antenna mounted to the mounting pole.

18. A bracket for mounting cables on a mounting pole, comprising:
   a pair of clamping members configured to be secured to a mounting pole;
   a cable hanger mounting member coupled to the pair of clamping members, the cable hanger mounting member comprising a flat panel including a plurality of mounting holes,
   wherein the flat panel defines a plane parallel to an axis defined by the mounting pole and the cable hanger mounting member is offset from the mounting pole.

19. The bracket defined in claim 18, wherein the mounting holes are arranged in a staggered pattern along the flat panel.

20. The bracket defined in claim 18, wherein the cable hanger mounting member is elongated in a dimension orthogonal to the axis of the mounting pole.

21. The bracket defined in claim 18, wherein each of the mounting holes is configured to receive and secure a cable hanger to the cable hanger mounting member.

22. The bracket defined in claim 18, wherein the pair of clamping members are secured to the mounting pole via a pair of rods and a securing component that engages each rod.

23. The bracket defined in claim 22, wherein the rods are threaded rods, and the securing components are nuts.

24. The bracket defined in claim 18, wherein the mounting pole is an antenna pole.

25. The bracket defined in claim 18, in combination with a mounting pole, the mounting pole being sandwiched between the pair of clamping members.

26. The bracket defined in claim 21, in combination with at least one cable hanger inserted into one of mounting holes.

27. The bracket defined in claim 26, wherein the at least one cable hanger is a plurality of cable hangers.

28. A bracket for mounting cables on a mounting pole, comprising:
   a pair of clamping members configured to be secured to a mounting pole;
   a cable hanger mounting member coupled to the pair of clamping members, the cable hanger mounting member comprising a flat panel including a plurality of mounting holes, the flat panel defining a plane parallel to the mounting pole,
   wherein the cable hanger mounting member is offset from, and elongated in a dimension orthogonal to, an axis of the mounting pole.

29. The bracket defined in claim 28, wherein the mounting holes are arranged in a staggered pattern along the flat panel of the cable hanger mounting member.

30. The bracket defined in claim 28, wherein each of the mounting holes is configured to receive and secure a cable hanger to the cable hanger mounting member.

31. The bracket defined in claim 28, wherein the pair of clamping members are secured to the mounting pole via a pair of rods and a securing component that engages each rod.

32. The bracket defined in claim 31, wherein the rods are threaded rods, and the securing components are nuts.

33. The bracket defined in claim 28, wherein the mounting pole is an antenna pole.

34. The bracket defined in claim 28, in combination with a mounting pole, the mounting pole being sandwiched between the pair of clamping members.

35. The bracket defined in claim 30, in combination with at least one cable hanger inserted into one of mounting holes.

36. The bracket defined in claim 35, wherein the at least one cable hanger is a plurality of cable hangers.

37. A bracket for mounting cables on a mounting pole, comprising:
   a pair of clamping members secured to a mounting pole via a pair of rods and a securing component that engages each rod;
   a cable hanger mounting member secured to the pair of clamping members via the pair of rods, the cable hanger mounting member comprising a flat panel and including a plurality of mounting holes,
   wherein the cable hanger mounting member is offset from the mounting pole and extends in a plane normal to the pair of rods.

38. The bracket defined in claim 37, wherein the mounting holes are arranged in a staggered pattern along the flat panel.

39. The bracket defined in claim 37, wherein the cable hanger mounting member is elongated in a dimension orthogonal to an axis of the mounting pole.

40. The bracket defined in claim 37, wherein each of the mounting holes is configured to receive and secure a cable hanger to the cable hanger mounting member.

41. The bracket defined in claim 37, wherein the rods are threaded rods, and the securing components are nuts.

42. The bracket defined in claim 37, wherein the mounting pole is an antenna pole.

43. The bracket defined in claim 37, in combination with a mounting pole, the mounting pole being sandwiched between the pair of clamping members.

44. The bracket defined in claim 40, in combination with at least one cable hanger inserted into one of mounting holes.

45. The bracket defined in claim 44, wherein the at least one cable hanger is a plurality of cable hangers.

* * * * *

UNITED STATES PATENT AND TRADEMARK OFFICE
CERTIFICATE OF CORRECTION

| | | |
|---|---|---|
| PATENT NO. | : 11,621,548 B2 | Page 1 of 1 |
| APPLICATION NO. | : 17/498857 | |
| DATED | : April 4, 2023 | |
| INVENTOR(S) | : Heath et al. | |

It is certified that error appears in the above-identified patent and that said Letters Patent is hereby corrected as shown below:

In the Claims

Column 7, Line 32, Claim 12: Please correct "%" to read --¾--

Signed and Sealed this
Twentieth Day of June, 2023

*Katherine Kelly Vidal*

Katherine Kelly Vidal
*Director of the United States Patent and Trademark Office*